United States Patent
Zhu et al.

(10) Patent No.: US 9,952,379 B2
(45) Date of Patent: Apr. 24, 2018

(54) BACKLIGHT MODULE AND DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventors: Kunpeng Zhu, Beijing (CN); Inho Park, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/801,382

(22) Filed: Jul. 16, 2015

(65) Prior Publication Data

US 2016/0209570 A1 Jul. 21, 2016

(30) Foreign Application Priority Data

Jan. 16, 2015 (CN) .......................... 2015 1 0023724

(51) Int. Cl.
- *G02F 1/1333* (2006.01)
- *G02F 1/1335* (2006.01)
- *F21V 8/00* (2006.01)

(52) U.S. Cl.
CPC ......... *G02B 6/0068* (2013.01); *G02B 6/0091* (2013.01); *G02F 1/133308* (2013.01); *G02F 1/133615* (2013.01); *G02F 2001/133314* (2013.01)

(58) Field of Classification Search
CPC combination set(s) only.
See application file for complete search history.

(56) References Cited

U.S. PATENT DOCUMENTS

| | | | |
|---|---|---|---|
| 8,253,886 B2 * | 8/2012 | Jeong | .................. G02B 6/0091 349/58 |
| 8,746,947 B2 | 6/2014 | Yi et al. | |
| 2010/0007817 A1 | 1/2010 | Kim | |
| 2012/0182494 A1 | 7/2012 | Yu et al. | |
| 2013/0257705 A1 | 10/2013 | Yu | |

FOREIGN PATENT DOCUMENTS

| | | |
|---|---|---|
| CN | 101625464 A | 1/2010 |
| CN | 104075192 A | 10/2014 |

OTHER PUBLICATIONS

First Chinese Office Action regarding Application No. 2015100237242 dated Jun. 3, 2016. Translation provided by Dragon Intellectual Property Law Firm.
Second Office Action regarding Chinese application No. 201510023724.2, dated Jan. 20, 2017. Translation provided by Dragon Intellectual Property Law Firm.

* cited by examiner

*Primary Examiner* — Wen-Ying P Chen
(74) *Attorney, Agent, or Firm* — Harness, Dickey & Pierce, P.L.C.

(57) ABSTRACT

The present disclosure relates to the field of liquid crystal display technology, discloses a backlight module and a display apparatus. The backlight module includes a back plate including a bottom plate and a side plate; a light bar including a body and a plurality of light emitting units arranged on the body. The body is fixed at an outer side of the side plate, the side plate is provided with holes at positions corresponding to the light emitting units. The light emitting units extend from the body to an inner side of the side plate through corresponding holes.

16 Claims, 1 Drawing Sheet

-Related art-

BACKLIGHT MODULE AND DISPLAY APPARATUS

CROSS-REFERENCE TO RELATED APPLICATION

The present application claims the priority of Chinese patent application No. 201510023724.2 filed on Jan. 16, 2015, the disclosure of which is incorporated herein by reference.

TECHNICAL FIELD

The present disclosure relates to the field of liquid crystal display technology, in particular to a backlight module and display apparatus.

BACKGROUND

Since the liquid crystal does not emit light itself, thus an external backlight source is needed to achieve displaying in a variety of liquid crystal displays (LCDs), such as LCD devices, LCD televisions. Backlight sources can be divided into two types, i.e., edge type and direct type according to their distribution positions. For an edge-type backlight source, due to its advantages, such as low requirements of the number of light emitting devices, low cost, and thin thickness, it is widely used in LCDs of small and medium size.

FIG. 1 is a partial sectional view of an edge-type backlight module, which includes a back plate 1, a light guide plate 5 and an optical film 7 which are arranged on the back plate 1 sequentially. The module further includes a rubber frame 4 configured to fix the light guide plate 5 and the optical film 7, a light bar 2 arranged close to a lateral side of the light guide plate 5. The light bar 2 includes a plurality of light emitting units 3 arranged thereon. A display panel 6 is arranged above the backlight module. A front frame 8 is also provided for assembling the backlight module and the liquid crystal panel 6. The light guide plate 5 is configured to transmit light from a near end to a far end to make light uniformly emitted from an entire light output surface, so as to form a surface light source for the display panel 6 for displaying.

However, it can be seen from FIG. 1 that, a distance L between the light emitting units 3 and a display region (A region) of the display panel 6 is short. Darker zones where less light illuminates and brighter zones where more light illuminates will be formed between adjacent light emitting units 3, that is, light mixed by the light emitting units 3 is not uniform. Such a phenomenon that brighter and darker zones are alternatively distributed is called a hot-spot phenomenon. In order to eliminate the darker zones, a distance between the light emitting units 3 needs to be reduced. In this way, however, a reduction of the number of the light emitting units 3 is limited, which is not conducive to reduce costs. Further, the space reserved for the light bar 2 is very small, which makes the light bar 2 is difficult to be assembled. The heat dissipation space of the light emitting units 3 is small, which makes heat dissipation be difficult and affects the quality of the module. In addition, a driving circuit board on the light bar 2 has a certain thickness, which is not conductive to make the display module thinner.

SUMMARY

The present disclosure provides a backlight module and a display apparatus, so as to solve the problems that light emitting units are close to a display region of a display panel, therefore a hot-spot phenomenon happens and a reduction of the number of light sources is limited, which is not conducive to reduce costs.

In order to solve the above problems, on an aspect, the present disclosure provides a backlight module including: a back plate including a bottom plate and a side plate, the bottom plate and the side plate enclosing a space with a top opening; a light bar including a body and a plurality of light emitting units arranged on the body, the body being fixed at an outer side of the side plate, the side plate being provided with holes at positions corresponding to the light emitting units; the light emitting units extend from the body to an inner side of the side plate through the corresponding holes.

Alternatively, the light bar further includes a shielding plate protruding from a top of the body towards a center of the back plate.

Alternatively, the light bar further includes a fixing plate protruding from a bottom of the body towards the center of the back plate; the fixing plate is positioned below the bottom plate and fixedly connected with the bottom plate.

Alternatively, the body of the light bar is fixed onto the back plate.

Alternatively, the body of the light bar is adhered on the back plate.

Alternatively, the back plate further includes a supporting plate protruding from a top of the side plate of the back plate towards the center of the back plate; the backlight module further includes a rubber frame arranged on the supporting plate; the shielding plate is arranged above the rubber frame.

Alternatively, the body of the light bar is made of a flexible material.

Alternatively, the backlight module further includes a light guide plate, the light guide plate is arranged on the bottom plate and the light emitting units are arranged close to a lateral side of the light guide plate.

On another aspect, the present disclosure further provides a display apparatus, including: a liquid crystal panel; the above backlight module, arranged below the liquid crystal panel and configured to provide a light source for the liquid crystal panel.

Alternatively, the light bar of the backlight module further includes a shielding plate protruding from a top of the body towards a center of the liquid crystal panel; and the shielding plate is arranged above the liquid crystal panel and corresponds to a non-display region of the liquid crystal panel.

On still another aspect, the present disclosure further provides a backlight module, including: a back plate including a bottom plate and a side plate arranged on the bottom plate; a light guide plate arranged on the bottom plate and located at an inner side of the side plate; and a light bar including a body and a plurality of light emitting units arranged on the body; the body is fixed at an outer side of the side plate; the side plate is provided with holes at positions corresponding to the light emitting units; the light emitting units directly face a lateral side of the light guide plate through the corresponding holes.

Alternatively, the light bar further includes a shielding plate protruding from a top of the body towards a center of the back plate, and a fixing plate protruding from a bottom of the body towards the center of the back plate; the fixing plate is positioned below the bottom plate and fixedly connected with the bottom plate.

Alternatively, the light emitting units extend from the body towards the lateral side of the light guide plate through the corresponding holes.

Alternatively, the body is made of a flexible material.

In the technical solution according to the present disclosure, by arranging the light bar to be positioned at the outer side of the back plate, a distance between the light emitting units and the display region is increased, thereby improving the hot-spot phenomenon. In the same optical level, the number of light-emitting units can be reduced and the cost is reduced; or, in the premise of not reducing the number of light emitting units, an area of the display region can be expanded. Moreover, it is much easier to mount the light bar from the outer side of the back plate. Since the light emitting units contact with air directly, the heat dissipation effect is good, thereby ensuring the quality of the module. At the same time, the light bar will not affect the thickness of the module, which is conducive to make the display module thinner.

BRIEF DESCRIPTION OF THE DRAWINGS

In order to more clearly illustrate the technical solutions according to the embodiments of the present disclosure or the related art, accompany drawings acquired to use in the description of the embodiments and the related art will be described briefly below. It is obvious that, the described drawings are merely parts of embodiments of the present disclosure, and other drawings can also be obtained according to these drawings for a person skilled in the art without creative work.

DETAILED DESCRIPTION

A backlight module of a liquid crystal display device includes a back plate and a light bar. The light bar includes a body and a plurality of light emitting units (such as LED lights) arranged on the body. The back plate includes a bottom plate and a side plate. The bottom plate and the side plate enclose a space with a top opening. Optical components are provided on the bottom plate. Light emitted from the light emitting units is adjusted by the optical components and then emitted uniformly towards a liquid crystal panel for displaying.

The present disclosure provides in one embodiment a backlight module. The light bar of the backlight module is arranged at an outer side of the side plate of the back plate. The side plate is provided with holes at positions corresponding to the light emitting units. The light emitting units extend through corresponding holes to be at an inner side of the side plate. Light emitted from the light emitting units passes through the optical components positioned in an inner side of the back plate and then exits.

Compared to the related art, in the technical solution according to the present disclosure, a distance between the light emitting units and the display region is increased by arranging the light bar at the outer side of the back plate, thereby improving the hot-spot phenomenon. In the same optical level, the number of light-emitting units can be reduced and the cost is reduced; or, in the premise of not reducing the number of light emitting units, an area of the display region can be expanded. Moreover, it is much easier to mount the light bar from the outer side of the back plate. Since the light emitting units directly contact with air, thus the heat dissipation effect is good, thereby ensuring the quality of the module. At the same time, the light bar does not affect the thickness of the module, which is conducive to make the display module thinner.

The working principle of the present disclosure is described as follows.

One of factors causing the hot-spot phenomenon is that the distance between the light emitting units and the display region is short. Therefore, by increasing the distance between the light emitting units and the display region, the hot-spot phenomenon can be improved.

Embodiments of the present disclosure will be further described below in conjunction with the accompanying drawings and examples. The following embodiments are merely used to illustrate the present disclosure, but not intended to limit the scope of the present invention.

Figure 2:
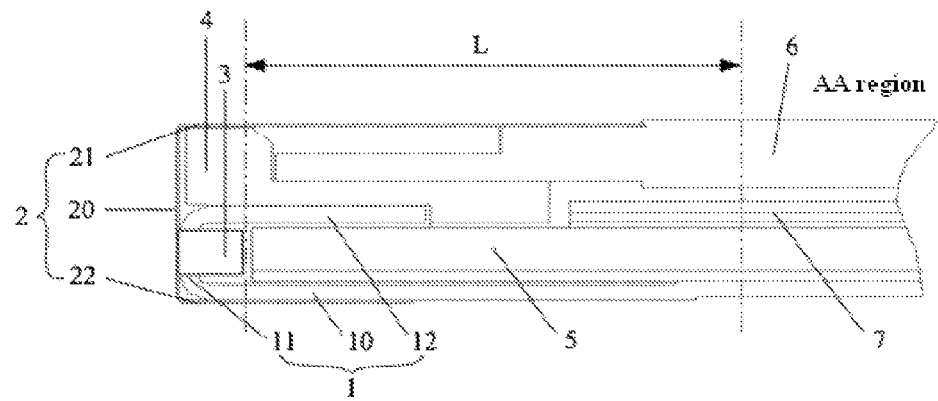
FIG. 2 is a partial sectional view of a display apparatus according to one embodiment of the present disclosure.

As shown in FIG. 2, the present disclosure provides in one embodiment a backlight module, including a back plate 1 and a light bar 2. The back plate 1 includes a bottom plate 10 and a side plate 11. The bottom plate 10 and the side plate 11 enclose a space with a top opening. The bottom plate 10 is provided with optical components, for example, a light guide plate 5 and an optical film 7. The light bar 2 includes a body 20 and a plurality of light emitting units 3 arranged on the body 20. The light bar 2 is fixed at an outer side of the side plate 11. The side plate 11 is provided with holes at positions corresponding to the light emitting units 3. The light emitting units 3 extend through corresponding holes to be in an inner side of the side plate 11. Light emitted from the light emitting units passes through the optical components positioned in an inner side of the back plate 1, and then exits.

The body 20 of the light bar 2 may be fixed directly onto the back plate 1 by adhesive, so as to be in the outer side of the side plate 11.

In the above solutions, by arranging the light bar of the backlight module at the outer side of the back plate, the distance L between the light emitting units and the display region AA is increased, thereby improving the hot-spot phenomenon. In the same optical level, the number of light-emitting units can be reduced and the cost is reduced; or, in the premise of not reducing the number of light emitting units, an area of the display region AA can be expanded. Moreover, it is much easier to mount the light bar from the outer side of the back plate 1. Since the light emitting units contact with air directly, thus the heat dissipation effect is good, thereby ensuring the quality of the module. At the same time, the light bar does not affect the thickness of the module, which is conducive to make the display module thinner.

As shown in FIG. 2, the present disclosure further provides in one embodiment a display apparatus, including a liquid crystal panel 6 and the backlight module. The backlight module is arranged below the liquid crystal panel 6 and provides a light source for the liquid crystal panel 6. By using the backlight module according to the present disclosure, the quality of the display apparatus can be improved, the number of light-emitting units can be reduced and the cost is reduced. Alternatively, in the premise of not reducing the number of light emitting units, an area of the display region AA can be expanded. At the same time, the display module can be made thinner.

The light bar 2 of the backlight module may further include a circuit board (not shown) configured to drive the light emitting units 3 to emit light. Specifically, the body 20 of the light bar 2 may be arranged as a base of the circuit board and the light emitting units 3 may be arranged on the base of the circuit board. Since the circuit board is arranged at the outer side of the back plate 1, the thickness of the backlight module will not be affected. Moreover, since the body 20 of the light bar 2 and the base of the circuit board are integrated as a whole, the structure can be simplified, and costs can be saved.

Figure 1:
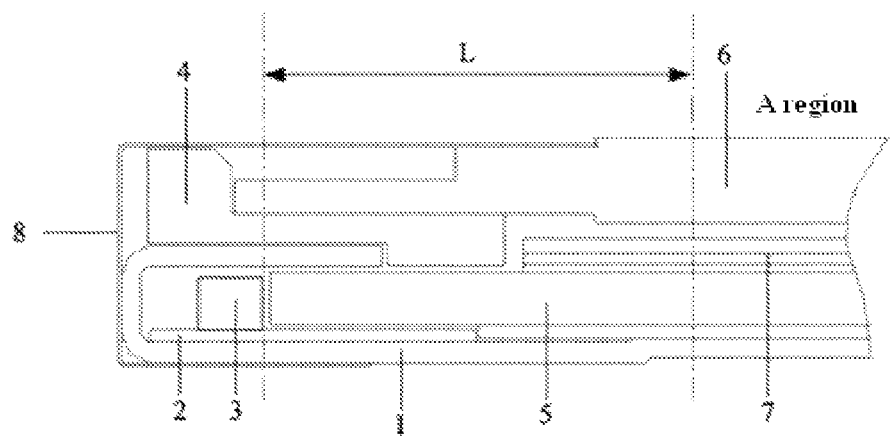
FIG. 1 is a partial sectional view of a display apparatus in the related art.

Alternatively, a shielding plate 21 is protruded from a top of the body 20 of the light bar 2 towards a center of the back plate 1. When assembling the display apparatus, the shielding plate 21 is located above the liquid crystal panel 6 and corresponds to a non-display region of the liquid crystal panel 6 so as to replace the front frame 8 (as shown in FIG. 1) in the related art. The shielding plate 21 is configured to fix the liquid crystal panel 6 and thus the front frame is omitted, thereby reducing the cost. At the same time, since the shielding plate 21 is arranged above the light emitting unit 3 and is opaque, the shielding plate 21 also plays a role of a cover band to prevent light leakage. Moreover, since the cover band is omitted, the thickness of the module can be reduced.

Further, the body 20 of the light bar 2 is made of a flexible material. Therefore, the stress onto the liquid crystal panel 6 can be buffered, which provides a protective effect.

In a specific embodiment, the circuit board of the light bar 2 is a flexible circuit board. The shielding plate 21 is formed by extending a base of the flexible circuit board and configured to fix the liquid crystal panel 6. The light emitting units 3 are made on the base of the flexible circuit board.

As shown in FIG. 2, in embodiments of the present disclosure, a fixing plate 22 is protruded from a bottom of the body of the light bar 2 towards the center of the back plate 1. The fixing plate 22 is positioned below the bottom plate 10 and fixedly connected with the bottom plate 10. Specifically, the fixing plate 22 can be fixedly connected with the bottom plate 10 by adhesive. At the time the fixing plate 22 fixes the light bar 2 onto the back plate 1, a combination of the fixing plate 22 and the shielding plate 21 has a function of fixing and assembling the liquid crystal panel 6 and the backlight module. As a result, the light bar 2 is not only a supporter for the light emitting units 3, but also a assemble member of the display apparatus, thereby simplifying the structure of the backlight module and reducing the cost.

Specifically, the shielding plate 21 and the fixing plate 22 may be formed by extending the base of the flexible circuit board of the light bar 2. The light emitting units 3 may be made on the base of the flexible circuit board.

In one embodiment of the present disclosure, the backlight module further includes a rubber frame 4 which is configured to fix the optical components (the light guide plate 5 and the optical film layer 7), and may further be configured to support the liquid crystal panel 6.

In order to reduce the size of the product, a supporting plate 12 is protruded from a top of the side plate 11 of the back plate 1 towards the center of the back plate 1. The rubber frame 4 is arranged on the supporting plate 12. The rubber frame 4 may be provided with a projection extending towards the center of the back plate 1. The projection is positioned above the optical components and configured to fix the optical components. The liquid crystal panel 6 may be arranged on the projection. The shielding plate 21 of the light bar 2 is positioned above the liquid crystal panel 6 and configured to fix the liquid crystal panel 6.

For an edge-type backlight module, the optical components may specifically include the light guide plate 5 and the optical film 7. The light guide plate 5 and the optical film 7 are arranged on the bottom plate of the back plate 1. The light emitting units 3 are arranged close to a lateral side of the light guide plate 5. The light guide plate 5 is configured to transmit the light from a near end to a far end to make the light emit uniformly towards the liquid crystal panel 6.

As shown in FIG. 2, in one embodiment of the present disclosure the backlight module may specifically include:

a back plate 1 including a bottom plate 10 and a side plate 11 arranged on the bottom plate, the bottom plate 10 and the side plate 11 enclosing a space with a top opening, a supporting plate 12 protruding from a top of the side plate 11 towards a center of the back plate 1; the side plate 11 being provided with holes at positions corresponding to the light emitting units 3;

a light guide plate 5 and an optical film 7 arranged on the bottom plate 10;

a rubber frame 4, arranged on the supporting plate 12 and provided with a projection extending towards the center of the back plate 1, the projection being positioned above the light guide plate 5 and configured to fix the light guide plate 5; and a light bar 2 including a flexible circuit board and the light emitting units 3 arranged on a base 20 of the flexible circuit board; the base 20 being fixed at an outer side of the side plate 11; the light emitting units 3 extending through corresponding holes in the side plate 11 so as to be in an inner side of the back plate 1 and being close to a lateral side of the light guide plate 5; a shielding plate 21 protruding from a top of the base 20 towards the center of the back plate 1 and a fixing plate 22 protruding from a bottom of the base 20 towards the center of the back plate 1; the fixed plate 22 being positioned below the bottom plate 10 and fixed onto the bottom plate 10 by adhesive, so as to fix the base 20 to the back plate 1.

As shown in FIG. 2, in one embodiment of the present disclosure, the display apparatus may specifically include:

the above-described backlight module;

a liquid crystal panel 6 arranged on the projection of the rubber frame 4; the shielding plate 21 of the light bar 2 being positioned above the liquid crystal panel 6, corresponding to a non-display region of the liquid crystal panel 6 and configured to fix the liquid crystal panel 6.

In the technical solution according to the present disclosure, by arranging the light bar to be positioned at the outer side of the back plate, the distance between the light emitting units and the display region is increased, thereby improving the hot-spot phenomenon. In the same optical level, the number of light-emitting units can be reduced and the cost is reduced; or, in the premise of not reducing the number of light emitting units, an area of the display region can be expanded. Moreover, it is much easier to mount the light bar from the outer side of the back plate. Since the light emitting units contact with air directly, thus the heat dissipation effect is good, thereby ensuring the quality of the module. At the same time, the light bar does not affect the thickness of the module, which is conducive to make the display module thinner.

The above is only preferred embodiments of the present disclosure, it should be noted that several improvements and modifications may be made for those of ordinary skill in the art without departing from the principle of the present disclosure, and also should be considered to fall within the protection scope of the present disclosure.

What is claimed is:
1. A backlight module comprising:
a back plate comprising a bottom plate and a side plate, the bottom plate and the side plate enclosing a space with a top opening; and
a light bar comprising a body, a plurality of light emitting units arranged on the body, and a shielding plate, wherein the body is adhered onto the back plate and arranged as a base of a circuit board and is fixed at an outer side of the side plate, and the side plate is provided with holes at positions corresponding to the light emitting units, the light emitting units extend from the body to an inner side of the side plate through the corresponding holes, the circuit board of the light bar is a flexible circuit board, and the shielding plate protruding from a top of the base of the circuit board towards a center of the back plate, the shielding plate is formed by extending the base of the flexible circuit board.

2. The backlight module according to claim 1, wherein the light bar further comprises a fixing plate protruding from a bottom of the body towards the center of the back plate; and the fixing plate is positioned below the bottom plate and fixedly connected with the bottom plate.

3. The backlight module according to claim 1, wherein the body of the light bar is fixed onto the back plate.

4. The backlight module according to claim 1, wherein the back plate further comprises a supporting plate protruding from a top of the side plate of the back plate towards the center of the back plate;
the backlight module further comprises a rubber frame arranged on the supporting plate; and
the shielding plate is arranged above the rubber frame.

5. The backlight module according to claim 1, wherein the backlight module further comprises a light guide plate, the light guide plate is arranged on the bottom plate and the light emitting units are arranged close to a lateral side of the light guide plate.

6. A display apparatus comprising:
a liquid crystal panel; and
the backlight module according to claim 1, wherein the backlight module is arranged below the liquid crystal panel and configured to provide a light source for the liquid crystal panel.

7. The backlight module according to claim 1, further comprising:
a light guide plate arranged on the bottom plate and located at an inner side of the side plate.

8. The backlight module according to claim 7, wherein the light bar further comprises a fixing plate protruding from a bottom of the body towards the center of the back plate; and the fixing plate is positioned below the bottom plate and fixedly connected with the bottom plate.

9. The backlight module according to claim 7, wherein the light emitting units extend from the body towards the lateral side of the light guide plate through the corresponding holes.

10. The backlight module according to claim 6, wherein the shielding plate is configured to fix the liquid crystal panel.

11. A backlight module comprising:
a back plate comprising a bottom plate and a side plate, the bottom plate and the side plate enclosing a space with a top opening; and
a light bar comprising a body, a plurality of light emitting units arranged on the body, a shielding plate, and a fixing plate protruding from a bottom of the body towards the center of the back plate and positioned below the bottom plate and fixedly connected with the bottom plate,
wherein the body is arranged as a base of a circuit board and is fixed at an outer side of the side plate, and the side plate is provided with holes at positions corresponding to the light emitting units, the light emitting units extend from the body to an inner side of the side plate through the corresponding holes, the circuit board of the light bar is a flexible circuit board, and the shielding plate protruding from a top of the base of the circuit board towards a center of the back plate, the shielding late is formed by extending the base of the flexible circuit board.

12. The backlight module according to claim 11, wherein
the back plate further comprises a supporting plate protruding from a top of the side plate of the back plate towards the center of the back plate; and
the backlight module further comprises a rubber frame arranged on the supporting plate; and the shielding plate is arranged above the rubber frame.

13. A backlight module comprising:
a back plate comprising a bottom plate and a side plate, the bottom plate and the side plate enclosing a space with a top opening; and
a light bar comprising a body, a plurality of light emitting units arranged on the body, and a shielding plate,
wherein the body is arranged as a base of a circuit board and is fixed at an outer side of the side plate, and the side plate is provided with holes at positions corresponding to the light emitting units, the light emitting units extend from the body to an inner side of the side plate through the corresponding holes, the circuit board of the light bar is a flexible circuit board, and the shielding plate protruding from a top of the base of the circuit board towards a center of the back plate, the shielding plate is formed by extending the base of the flexible circuit board, and
wherein the back plate further comprises a supporting plate protruding from a top of the side plate of the back plate towards the center of the back plate, the backlight module further comprises a rubber frame arranged on the supporting plate, and the shielding plate is arranged above the rubber frame.

14. The backlight module according to claim 13, wherein the light bar further comprises a fixing plate protruding from a bottom of the body towards the center of the back plate; and the fixing plate is positioned below the bottom plate and fixedly connected with the bottom plate.

15. The backlight module according to claim 13, wherein the body of the light bar is fixed onto the back plate.

16. The backlight module according to claim 13, wherein the body of the light bar is adhered onto the back plate.

* * * * *